Aug. 18, 1964     C. L. SPORCK     3,144,845
METAL WORKING
Original Filed Sept. 23, 1955     2 Sheets-Sheet 1
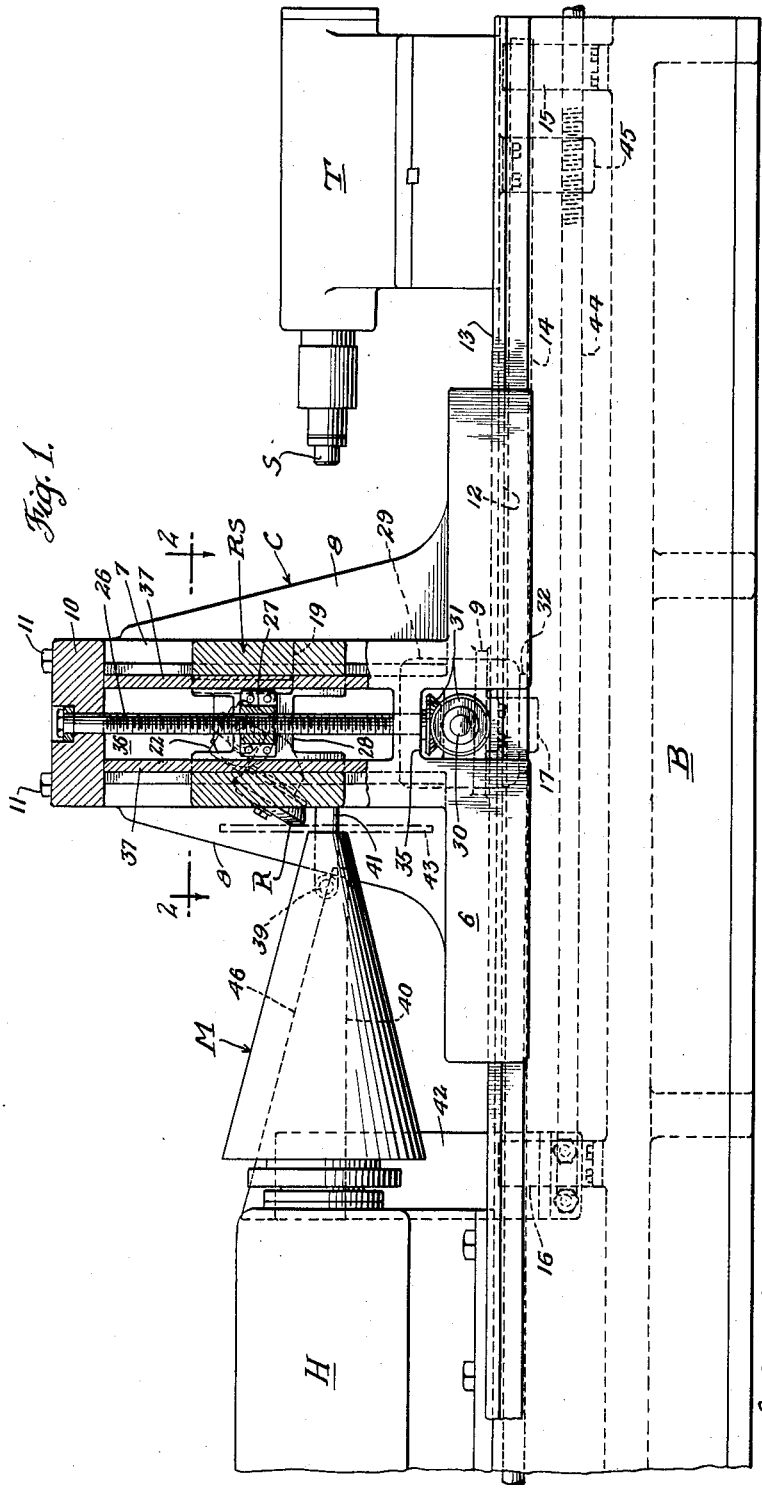
INVENTOR:
Claus L. Sporck
ATTORNEYS:

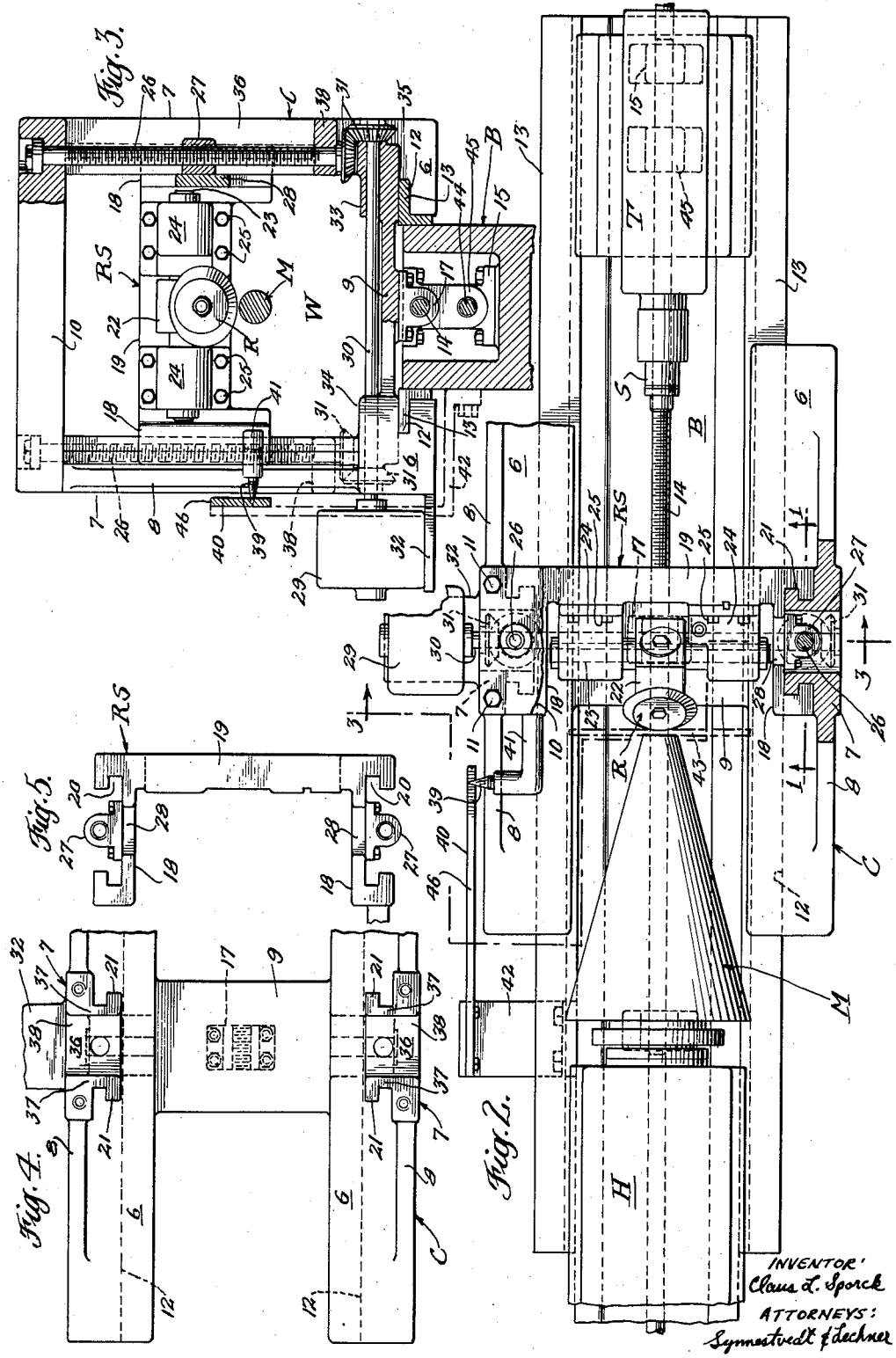

United States Patent Office 3,144,845
Patented Aug. 18, 1964

3,144,845
METAL WORKING
Claus L. Sporck, Cincinnati, Ohio, assignor to The Lodge & Shipley Company, Cincinnati, Ohio, a corporation of Ohio
Continuation of application Ser. No. 536,085, Sept. 23, 1955. This application Nov. 13, 1959, Ser. No. 852,769
3 Claims. (Cl. 113—52)

This invention relates to the art of metal-working and, in particular, relates to apparatus for carrying out methods for forming hollow articles from sheet metal blanks such as disclosed in copending application of Claus L. Sporck, Serial No. 407,010, filed January 29, 1954, now abandoned.

This application is a continuation of my copending application Serial No. 536,085, filed September 23, 1955, and entitled Metal Working, now abandoned.

One object of the invention is to provide in a metal-working machine a horizontally-arranged spindle together with a roller adapted to be moved during a working operation in a vertical plane containing the rotational axis of the spindle.

Another object of the invention is to provide in a metal-working machine a carriage which is generally rectangular in shape and carries a vertically movable shoe adapted to mount a working roller.

Another object of the invention is to provide in a metal-working machine a horizontally-arranged spindle to support a blank and a carriage to support a roller for working the blank, the carriage providing for the roller to have a vertical component of motion during a working operation.

Another object of the invention is to provide in a metal-working machine a horizontally-arranged spindle adapted to mount a blank to be worked and a horizontally-arranged tail-stock adapted to clamp a blank on a spindle together with a carriage mounting a working roller, the carriage being arranged to permit the tailstock to be positioned closely to the spindle when clamping the blank.

Another object of the invention is to provide in a metal-working machine a spindle adapted to mount a blank and a carriage mounting a roller to work the blank, the carriage having webs functioning as strengthening members and as safety shields.

The manner in which the foregoing objects are obtained together with certain other features and objects of the invention will be apparent from the following description and drawings wherein:

FIGURE 1 is a side elevational view of a metal-working machine having a vertically movable forming roller, the view being partly in section on the line 1—1 of FIGURE 2;

FIGURE 2 is a plan view of FIGURE 1 with the front vertical guide in section as taken on the line 2—2 of FIGURE 1;

FIGURE 3 is a vertical cross section taken substantially on the line 3—3 of FIGURE 2;

FIGURE 4 is a fragmentary plan view of the carriage with the top cross brace removed; and FIGURE 5 is a plan view of the vertically movable roller or tool support.

The machine comprises in general a base or bed plate B, a headstock H, a tailstock T, a carriage or frame C, a mandrel or spindle M, in this instance of conical form, rotatably mounted in the headstock, a forming roller or tool R carried by a shoe RS mounted in the carriage for up and down movement, and a rotatable head S rotatably mounted in the tailstock. The spindle and head axes are coaxial.

The carriage C includes a pair of laterally-spaced longitudinally extending guide members 6—6, a pair of upright columns or structural members 7—7 extending upwardly from the guide members and braced by webs 8, a bottom transverse bridge member or cross piece 9 connecting the columns 7—7 and guide members 6—6, and an upper cross piece 10 secured to the upright columns by bolts 11.

The guide members 6—6 are provided with longitudinally extending grooves 12—12 fitting a pair of longitudinally extending guide rails 13—13 secured to the base B. Thus, the carriage C is supported from the base for back and forth sliding movement.

Back and forth movement is imparted to the carriage by means of a lead screw 14 rotatably mounted in brackets 15 and 16 secured to the base B and adapted to be rotated in a known manner. The lead screw has threaded engagement with a nut 17 secured to the bridge member 9 on the carriage.

The shoe RS is of channel form in plan view as seen in FIGURE 5, and comprises side portions 18—18 and a transverse connecting portion 19, the side portions having guideways 20 adapted to slidingly fit cooperating upright guides 21 formed on the columns 7—7. The shoe is thus mounted on the carriage for up and down sliding movement.

The forming roll R is mounted on a roller rest 22 such as disclosed in copending application of Claus L. Sporck, Serial No. 462,695, filed October 18, 1954, now abandoned. This rest 22 is supported by means of a bar 23 and blocks 24—24, which are secured by means of bolts 25 to the transverse connecting portion 19 of the shoe RS. The bar 23 is adjustable in the blocks 24—24 so that the roller can be tilted in a vertical plane.

Up and down movement is imparted to the shoe RS by means of vertically disposed screws 26—26 operating in nuts 27—27 secured to the webs 28—28. The screws 26—26 are rotated by a hydraulic motor 29 through the medium of a transverse drive shaft 30 and bevel gears 31—31. It is to be observed that with the particular arrangement of bevel gears shown in FIGURES 2 and 3, the threads of the vertical screws 26—26 are opposite, i.e., one is right-hand and the other left-hand, so that both nuts 27—27 will be moved in the same direction by the screws which rotate in opposite directions.

The motor 29 is mounted on a bracket 32 extending outwardly from the carriage, and the drive shaft 30 has end bearings 33 and 34 in the guide members 6—6. The bevel gears of this shaft are secured thereon outboard of the bearings 33 and 34. The mating bevel gears are secured on the lower ends of the vertical screws 26—26 and open pockets 35 are provided in the lower portion of the carriage to accommodate these gears.

The vertical screws 26—26 extend upwardly through the vertical spaces 36 between the side walls 37—37 of the columns 7—7 and are rotatably supported at their lower ends in the webs 38 and at their upper ends in the cross brace 10. The nuts 27—27 of the shoe RS operate in the vertical spaces 36.

The hydraulic motor 29 for imparting the up and down movement to the shoe RS is under control of tracer control mechanism which includes a finger or tracer valve 39 cooperating with a templet 40 configured to conform to the article being formed. The tracer control mechanism may be of conventional type.

The finger 39 is mounted in a bracket 41 secured to the side portion 18 of the shoe RS and the templet 40 is supported from the base B by means of a bracket 42 suitably bent to clear the carriage in its back and forth movement as clearly shown in dot and dash lines in FIGURE 3.

The operation of the machine is as follows. A blank 43 is placed against the mandrel M and the tailstock T is moved up close to the blank (into the well W provided by the arrangement of the carriage as seen in FIGURE 3) by means of the lead screw 44 and nut 45. Then the rotatable head S of the tailstock is moved up to the blank (by means not shown in the tailstock) to engage and clamp the same against the spindle. The spindle is then rotated to cause rotation of the blank. The carriage controlling lead screw 14 is then rotated at a predetermined speed to impart movement of the carriage in a direction toward the headstock. This causes the roller R to rotate and begin to flow the metal of the blank onto the spindle. At the same time, the finger 39 engages and follows the inclined surface 46 of the templet and is actuated to control the hydraulic motor 29 in a manner to impart upward movement to the shoe RS corresponding to the taper of the spindle. After the article has been formed, the carriage and tailstock are moved to the rear (to the right as viewed in FIGURE 1) and the formed article removed.

Before closing, it is desired to point out more in detail some of the advantages of the invention. For example, in FIGURE 1 it will be seen that when the roller R has first contacted the blank 43, the webs 8 on the carriage are positioned so that if the tailstock should allow the blank to fly off the spindle, its motion in a direction transverse the machine will be arrested. Thus, the webs 8 not only serve to strengthen the carriage but, in addition, act as safety shields.

In setting up the machine for a working operation, the tailstock can be moved into the well W very close to the spindle so that the amount that the head S projects outwardly from the tailstock in clamping the blank is very small and, therefore, there is no large cantilever effect. The foregoing is provided by the rectangular shape of the carriage and by the arrangement of the shoe to be substantially above the rotational axes of the spindle and tailstock.

The rectangular shape of the carriage and the arrangement of the shoe thereon provides for the components making up the same to be of heavy structural form. Thus, the carriage can be built large and strong and thus, able to withstand large forces involved in the working of blanks.

The movement of the roller in a vertical direction is important in providing free access to the spindle. For example, it will be apparent that when the carriage and tailstock are backed away from the spindle for the unloading of a formed article, the space on either side of the spindle is free from obstruction. In addition, the width of the machine is reduced over that over-all width which would be necessary were the roller located on the side of the machine.

I claim:

1. In a metal working machine: an elongated horizontally disposed bed; a rotatable spindle supported adjacent one end of the bed and adapted to mount a blank to be worked; a rotatable tailstock mounted adjacent the opposite end of said bed and movable toward said spindle for the purpose of engaging and holding a blank mounted on the spindle and movable away from said spindle to release a blank thereon; and a carriage disposed on said bed for movement toward and away from said spindle, said carriage having a pair of elongated spaced-apart guide members respectively movably mounted on opposite sides of the bed, a pair of upright columns respectively secured to said guide members substantially centrally thereof, a bridge member extending across said bed and connected to said columns at their lower ends thereof, the bridge member being disposed substantially below the rotational axis of the spindle, a cross-beam extending across said bed and connected to said columns at the upper ends thereof, the cross-beam being disposed substantially above the rotational axis of the spindle, the bridge member, the upright columns and the cross-beam respectively forming a generally rectangular-shaped, open centered upright frame, said movement of the tailstock being accommodated by said open centered construction, a shoe extending interjacent said columns and connected thereto for motion in a vertical direction, a roller support mounted on said shoe, a roller mounted on said support, the support and the shoe being constructed and arranged whereby to be substantially above the rotational axis of the spindle when the roller first engages a blank whereby to be spaced from the tailstock engaging the blank.

2. In a metal-working machine, an elongated bed; a rotatable spindle supported on said bed and adapted to mount a blank to be worked; a carriage mounted on said bed for movement along the axis of the spindle and comprising an open centered, generally rectangular-shaped rigid, unified upright frame; a rotatable tailstock mounted on the bed for movement up to said spindle for the purpose of engaging and thereby holding a blank mounted on said spindle, said movement of the tailstock being accommodated by the open centered construction of said carriage; a roller adapted to work a blank mounted on the spindle; and a shoe supporting said roller and mounted on said carriage within said frame for movement in a vertical direction, the shoe being arranged whereby to be substantially above the rotational axis of the spindle when the roller first engages a blank so as to be spaced from the tailstock engaging the blank.

3. In a metal working machine:
   a bed;
   a rotatable spindle supported on said bed and adapted to mount a metal blank to be worked by a roller displacing a portion of the same;
   a pair of rigid structural members disposed on opposite sides of the rotational axis of said spindle and a pair of rigid cross pieces disposed on opposite sides of said axis and respectively fixedly connected adjacent opposite ends of said structural members, the pair of structural members and the pair of cross pieces forming a rigid, unified, open-centered frame;
   a rotatable tailstock mounted on said bed for movement up to said spindle for the purpose of engaging and holding a blank mounted on said spindle and for movement away from the spindle for releasing the blank, said open-centered construction of the frame accommodating said tail stock movement;
   means interconnecting said frame to said bed and providing for movement of the frame along the axis of and over the spindle;
   a roller for engaging and displacing metal of said blank when the blank is mounted on said spindle;
   a shoe disposed within the open-centered area of said frame and supporting said roller, the shoe extending between the structural members;
   slide means on each of said structural members supporting said shoe for movement within the frame in a direction toward and away from the rotational axis of the spindle;
   power drive mechanism on said frame for controllably moving the shoe along the slide means toward and away from said axis during a working operation, the open-centered construction of the frame and said shoe movement cooperating to permit movement of the frame, the shoe and the roller over said spindle and blank during a working operation, the power drive mechanism including drive screw means mounted on said frame and nut means mounted on said shoe and connected to and drivingly cooperating with said screw means.

References Cited in the file of this patent

UNITED STATES PATENTS

| 1,602,860 | Sleeper | Oct. 12, 1926 |
| 1,728,002 | Nelson | Sept. 10, 1929 |
| 1,968,296 | Hiester | July 31, 1934 |
| 2,330,811 | Darner et al. | Oct. 5, 1943 |
| 2,388,545 | Horak | Nov. 6, 1945 |

FOREIGN PATENTS

| 598,854 | Great Britain | Feb. 27, 1948 |